US007617459B2

United States Patent
Ho et al.

(10) Patent No.: US 7,617,459 B2
(45) Date of Patent: Nov. 10, 2009

(54) APPARATUS, SYSTEM, AND METHOD FOR AUTOMATICALLY GENERATING A WEB INTERFACE FOR AN MFS-BASED IMS APPLICATION

(75) Inventors: Shyh-Mei F. Ho, Cupertino, CA (US); Tony Y. Tsai, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/766,336

(22) Filed: Jan. 28, 2004

(65) Prior Publication Data

US 2005/0165826 A1 Jul. 28, 2005

(51) Int. Cl.
*G06F 3/00* (2006.01)
*G06F 9/44* (2006.01)
(52) U.S. Cl. .................... 715/762; 717/106
(58) Field of Classification Search ............. 715/762; 717/106
See application file for complete search history.

(56) References Cited

U.S. PATENT DOCUMENTS

| | | | | |
|---|---|---|---|---|
| 4,740,783 A | | 4/1988 | Lawrence et al. ............ 340/720 |
| 5,488,648 A | * | 1/1996 | Womble ...................... 379/13 |
| 5,761,656 A | | 6/1998 | Ben-Shachar .................. 707/4 |
| 5,781,739 A | * | 7/1998 | Bach et al. ................... 709/227 |
| 5,870,549 A | | 2/1999 | Bobo ........................... 709/206 |
| 5,899,975 A | | 5/1999 | Nielsen ..................... 704/270.1 |
| 5,960,200 A | | 9/1999 | Eager et al. .................. 395/705 |
| 6,067,579 A | | 5/2000 | Hardman et al. |
| 6,097,688 A | | 8/2000 | Ichimura et al. |
| 6,128,622 A | | 10/2000 | Bach et al. ................... 707/103 |

(Continued)

FOREIGN PATENT DOCUMENTS

JP 2001273177 10/2001
WO WO 01/67290 9/2001

OTHER PUBLICATIONS

Component of the Week: "XMI Toolkit", Jun. 1, 2001 http://www-106.ibm.com/developerworks/library/co-cow21.html.

(Continued)

*Primary Examiner*—Joshua D Campbell
*Assistant Examiner*—Stephen Alvesteffer
(74) *Attorney, Agent, or Firm*—Kunzler & McKenzie

(57) ABSTRACT

An apparatus, system, and method are provided for automatically generating a web interface for an MFS-based IMS application. The apparatus, system, and method include an import module that imports MFS-based IMS source files corresponding to an MFS-based IMS application. A metadata generator stores a standardized metadata description of the Message Input Description (MID) and Message Output Description (MOD) for the MFS-based IMS application. The standardized metadata description may comprise one or more XMI files. A code generator generates a middleware application corresponding to the MFS-based IMS application from the standardized metadata descriptions. The middleware application comprises an interface between a client application and the corresponding MFS-based IMS application. The present invention may include a command-line interface that allows one or more parameter sets to be provided by a user as a single input. The present invention may also include a deployment module that transmits and/or installs the standardized metadata descriptions and middleware applications on suitable servers to enable the web interface.

30 Claims, 6 Drawing Sheets

U.S. PATENT DOCUMENTS

| | | | |
|---|---|---|---|
| 6,141,660 A * | 10/2000 | Bach et al. | 707/103 R |
| 6,212,550 B1 | 4/2001 | Segur | 709/206 |
| 6,243,737 B1 | 6/2001 | Flanagan et al. | |
| 6,250,309 B1 | 6/2001 | Krichen et al. | 128/899 |
| 6,253,200 B1 | 6/2001 | Smedley et al. | 707/4 |
| 6,256,676 B1 | 7/2001 | Taylor et al. | 709/246 |
| 6,259,447 B1 | 7/2001 | Kanetake et al. | 715/764 |
| 6,289,382 B1 | 9/2001 | Bowman-Amuah | 709/226 |
| 6,446,110 B1 | 9/2002 | Lection et al. | 709/203 |
| 6,453,343 B1 | 9/2002 | Housel et al. | 709/213 |
| 6,507,856 B1 | 1/2003 | Chen et al. | 707/513 |
| 6,507,857 B1 | 1/2003 | Yalcinalp | 715/513 |
| 6,510,466 B1 | 1/2003 | Cox et al. | |
| 6,519,617 B1 | 2/2003 | Wanderski et al. | 707/513 |
| 6,535,896 B2 | 3/2003 | Britton et al. | |
| 6,560,639 B1 * | 5/2003 | Dan et al. | 709/218 |
| 6,589,291 B1 | 7/2003 | Boag et al. | 715/513 |
| 6,591,272 B1 | 7/2003 | Williams | 707/102 |
| 6,601,071 B1 | 7/2003 | Bowker et al. | 707/102 |
| 6,606,642 B2 | 8/2003 | Ambler et al. | 709/200 |
| 6,613,098 B1 | 9/2003 | Sorge et al. | 715/503 |
| 6,665,861 B1 * | 12/2003 | Francis et al. | 717/120 |
| 6,668,354 B1 | 12/2003 | Chen et al. | 715/517 |
| 6,687,873 B1 | 2/2004 | Ballantyne et al. | 715/500 |
| 6,728,685 B1 | 4/2004 | Ahluwalia | 705/26 |
| 6,738,975 B1 | 5/2004 | Yee et al. | |
| 6,753,889 B1 | 6/2004 | Najmi | 715/784 |
| 6,772,206 B1 | 8/2004 | Lowry et al. | 709/223 |
| 6,775,680 B2 | 8/2004 | Ehrman et al. | 707/102 |
| 6,799,299 B1 | 9/2004 | Li et al. | 715/513 |
| 6,816,883 B2 | 11/2004 | Baumeister et al. | |
| 6,889,360 B1 | 5/2005 | Ho et al. | 715/513 |
| 6,901,403 B1 | 5/2005 | Bata et al. | 707/101 |
| 6,901,430 B1 | 5/2005 | Smith | 709/206 |
| 6,904,598 B2 | 6/2005 | Abileah et al. | 719/319 |
| 6,907,564 B1 | 6/2005 | Burchhardt et al. | 715/513 |
| 6,909,903 B2 | 6/2005 | Wang | |
| 6,910,216 B2 | 6/2005 | Abileah et al. | 719/319 |
| 6,912,719 B2 | 6/2005 | Elderon et al. | 719/319 |
| 6,915,523 B2 | 7/2005 | Dong et al. | 719/319 |
| 6,948,117 B2 | 9/2005 | Van Eaton et al. | |
| 6,948,174 B2 | 9/2005 | Chiang et al. | 719/319 |
| 6,952,717 B1 | 10/2005 | Monchilovich et al. | 709/205 |
| 6,964,053 B2 | 11/2005 | Ho et al. | 719/319 |
| 6,971,096 B1 | 11/2005 | Ankireddipally et al. | 718/101 |
| 6,980,963 B1 | 12/2005 | Hanzek | 705/26 |
| 7,000,238 B2 | 2/2006 | Nadler et al. | |
| 7,013,306 B1 | 3/2006 | Turba et al. | 707/101 |
| 7,024,413 B2 | 4/2006 | Binding et al. | |
| 7,043,687 B2 | 5/2006 | Knauss et al. | |
| 7,051,032 B2 | 5/2006 | Chu-Carroll et al. | |
| 7,054,901 B2 | 5/2006 | Shafer | |
| 7,069,291 B2 | 6/2006 | Graves et al. | 709/201 |
| 7,080,092 B2 | 7/2006 | Upton | 707/102 |
| 7,111,011 B2 | 9/2006 | Graves et al. | |
| 7,120,645 B2 | 10/2006 | Manikutty et al. | |
| 7,120,702 B2 | 10/2006 | Huang et al. | |
| 7,124,299 B2 | 10/2006 | Dick et al. | |
| 7,130,893 B2 | 10/2006 | Chiang et al. | 709/219 |
| 7,134,075 B2 | 11/2006 | Hind et al. | |
| 7,143,190 B2 | 11/2006 | Christensen et al. | 709/246 |
| 7,152,205 B2 | 12/2006 | Day et al. | |
| 7,266,582 B2 | 9/2007 | Stelting | |
| 7,296,226 B2 | 11/2007 | Junkermann | |
| 2001/0014900 A1 | 8/2001 | Brauer et al. | 707/513 |
| 2001/0016869 A1 | 8/2001 | Baumeister et al. | |
| 2001/0047311 A1 | 11/2001 | Singh | 705/26 |
| 2002/0010716 A1 | 1/2002 | McCartney et al. | 707/517 |
| 2002/0035583 A1 | 3/2002 | Price et al. | 707/513 |
| 2002/0038335 A1 | 3/2002 | Dong et al. | 709/203 |
| 2002/0038336 A1 | 3/2002 | Abileah et al. | 709/203 |
| 2002/0042849 A1 | 4/2002 | Ho et al. | 709/329 |
| 2002/0046294 A1 | 4/2002 | Brodsky et al. | 709/246 |
| 2002/0049815 A1 | 4/2002 | Dattatri | 709/206 |
| 2002/0056012 A1 | 5/2002 | Abileah et al. | 709/310 |
| 2002/0059344 A1 | 5/2002 | Britton et al. | 707/513 |
| 2002/0078010 A1 | 6/2002 | Ehrman et al. | 707/1 |
| 2002/0078255 A1 * | 6/2002 | Narayan | 709/316 |
| 2002/0083099 A1 | 6/2002 | Knauss et al. | 707/513 |
| 2002/0099735 A1 | 7/2002 | Schroeder et al. | 707/513 |
| 2002/0100027 A1 | 7/2002 | Binding et al. | 717/137 |
| 2002/0111989 A1 | 8/2002 | Ambler et al. | 709/202 |
| 2002/0116454 A1 | 8/2002 | Dyla et al. | 709/203 |
| 2002/0133569 A1 | 9/2002 | Huang et al. | 709/219 |
| 2002/0143820 A1 | 10/2002 | Van Eaton et al. | 707/517 |
| 2002/0156930 A1 | 10/2002 | Velasquez | |
| 2002/0160745 A1 | 10/2002 | Wang | 455/404 |
| 2002/0161801 A1 | 10/2002 | Hind et al. | 707/513 |
| 2002/0174340 A1 | 11/2002 | Dick et al. | 713/178 |
| 2002/0178290 A1 | 11/2002 | Coulthard et al. | 709/246 |
| 2002/0178299 A1 | 11/2002 | Teubner | 709/320 |
| 2002/0188688 A1 | 12/2002 | Bice et al. | 709/206 |
| 2002/0194227 A1 | 12/2002 | Day et al. | 707/523 |
| 2002/0198974 A1 | 12/2002 | Shafer | 709/223 |
| 2003/0004746 A1 | 1/2003 | Kheirolomoom et al. | 705/1 |
| 2003/0007397 A1 | 1/2003 | Kobayashi et al. | 365/200 |
| 2003/0065623 A1 | 4/2003 | Corneil et al. | 705/64 |
| 2003/0070006 A1 | 4/2003 | Nadler et al. | 709/330 |
| 2003/0074217 A1 | 4/2003 | Beisiegel et al. | 705/1 |
| 2003/0081002 A1 | 5/2003 | De Vorchik et al. | 345/762 |
| 2003/0093403 A1 | 5/2003 | Upton | 707/1 |
| 2003/0093436 A1 | 5/2003 | Brown et al. | 707/103 |
| 2003/0093468 A1 | 5/2003 | Gordon et al. | 709/203 |
| 2003/0093500 A1 | 5/2003 | Khodabakchian et al. | 709/219 |
| 2003/0120730 A1 | 6/2003 | Kuno et al. | 709/204 |
| 2003/0159111 A1 | 8/2003 | Fry | 715/513 |
| 2003/0163585 A1 | 8/2003 | Elderon et al. | 709/246 |
| 2003/0191970 A1 | 10/2003 | Devine et al. | |
| 2003/0204460 A1 | 10/2003 | Robinson et al. | 705/35 |
| 2003/0212686 A1 | 11/2003 | Chu-Carroll et al. | 707/100 |
| 2004/0006739 A1 | 1/2004 | Mulligan | 715/513 |
| 2004/0024820 A1 | 2/2004 | Ozzie et al. | 709/205 |
| 2004/0030740 A1 | 2/2004 | Stelting | 709/201 |
| 2004/0054969 A1 * | 3/2004 | Chiang et al. | 715/513 |
| 2004/0054970 A1 | 3/2004 | Chiang et al. | 715/523 |
| 2004/0064466 A1 | 4/2004 | Manikutty et al. | 707/100 |
| 2004/0103370 A1 | 5/2004 | Chiang et al. | 715/513 |
| 2004/0111464 A1 | 6/2004 | Ho et al. | 709/203 |
| 2004/0205731 A1 | 10/2004 | Junkermann | 717/136 |
| 2004/0221292 A1 | 11/2004 | Chiang | 719/310 |
| 2004/0230987 A1 * | 11/2004 | Snover et al. | 719/320 |
| 2004/0237034 A1 | 11/2004 | Chiang et al. | 715/513 |
| 2005/0050228 A1 | 3/2005 | Perham et al. | 709/246 |
| 2005/0091639 A1 | 4/2005 | Patel | 717/114 |
| 2005/0165826 A1 | 7/2005 | Ho et al. | 707/102 |
| 2005/0165936 A1 | 7/2005 | Haller et al. | 709/228 |
| 2005/0166209 A1 | 7/2005 | Merrick et al. | 719/310 |
| 2005/0171970 A1 | 8/2005 | Ozzie et al. | 707/102 |
| 2005/0203944 A1 | 9/2005 | Dinh et al. | 707/102 |
| 2005/0210414 A1 | 9/2005 | Angiulo et al. | 715/838 |
| 2006/0265478 A1 | 11/2006 | Chiang et al. | 709/219 |
| 2007/0083524 A1 | 4/2007 | Fung et al. | 707/10 |
| 2007/0094283 A1 | 4/2007 | Fung et al. | 707/101 |

OTHER PUBLICATIONS

Microsoft Corp, Computer Dictionary, Third Edition, Microsoft Press, 1997, p. 371.
"NetDynamics, PAC for IMS" User Guide, Precise Connectivity Systems, 1998.
UML™ for EAI. UML™ Profile and Interchange Models for Enterprise Application Integration (EAI). OMG document No. ad/2001-09-17.
Long et al. "IMS Primer" Jan. 2000, IBM, Chapter 18.

"Correlate IMSADF Secondary Transaction MFS Generation with the Generation of the Output Format Rule", IBM Technical Disclosure Bulletin, vol. 27, No. 1B, pp. 623-624, Jun. 1984.

"Remote Execution of IMS Transactions for Os/2", IBM Technical Disclosure Bulletin, vol. 34, No. 7B, pp. 16, Dec. 1991.

"Connecting to IMS Using XML, SOAP and web Services", Shyh-Mei F. Ho, IMS Technical Conference, Koenigswinter, Germany, Oct. 15-17, 2002.

"Web Services—The Next Step in the Evolution of the Web", Excerpt from http://www.3.ibm.com/software/data/ims/...ntations/two/imsv7enh/HTML/indexp51.htm. IBM Corporation, 2002.

"Leveraging IMS Applications and Data"< Excerpts from Leveraging IMS2 found at http://www.3.ibm.com/software/data/ims/...ntations/two/imsv7enh/HTML/indexp52.htm IBM Corporation, 2002.

"What's Next in IMS Providing Integrated e-business Solutions: IMS Version 8", Excerpt from http://www.3.ibm.com/software/data/ims/...ntations/two/imsv7enh/HTML/indexp53.htm IBM Corporation, 2002.

"IMS Follow-on Ideal for e-business", Excerpts from http://www.3.ibm.com/software/data/ims/...ntations/two/imsv7enh/HTML/indexp54.htm IBM Corporation, 2002.

"IMS Information", Excerpts from http://www.3.ibm.com/software/data/ims/...ntations/two/imsv7enh/HTML/indexp55.htm IBM Corporation, 2002.

"Web Services Description Language (WSDL) 1." Mar. 2001, W3C.

Extensible Markup Language (XML) 1.0 (Second Edition) Oct. 2000, W3C.

"IMS Connect Guide and Reference version 1", http://publibfp.boulder.ibm.com/epubs/pdf/icgr0001.pdf, Oct. 2000, IBM.

Hofstetter, The Future's Future: Implications of Emerging Technology for Special Education Program Planning, Journal of Special Education Technology, Fall 2001, vol. 16, p. 7, 7 pgs.

Diaz et al., Inter-Organizational Document Exchange—Facing the Conversion Problem with XML, ACM 2002, pp. 1043-104.

Arndt et al., An XML-Based Approach to Multimedia Software Engineering for Distance Learning, ACM 2002, pp. 525-532.

Glushko et al., An XML Framework for Agent-Based E-Commerce, ACM Mar. 1999, pp. 106-114.

Dymetman at al., XML and Multilingual Document Authoring: Convergent Trends, ACM Jul. 2000, pp. 243-249.

PR Newswire, XMLSolutions Delivers XML-based Prototype for Envera Marketplace, ProQuest, Apr. 2000, pp. 1-3.

Suzuki et al., Managing the Software Design Documents with XML, ACM 1999, pp. 127-136.

Stieren, SST: Using Single-sourcing, SGML, and Teamwork for Documentation, ACM 1999, pp. 45-52.

Royappa, Implementing Catalog Clearinghouses with XML and XSL, ACM 1998, pp. 616-623.

"XML and IMS for Transparent Application Integration", Excerpt from http://www-3.ibm.com/software/data/ims/...ntations/two/imsv7enh/HTML/indexp50.htm. IBM Corporation, 2002.

Absa Uses VGR to Ensure Online Availability, www-306.ibm.com/software/data/ims/quarterly/Winter2000/winter.htm Approx. Oct. 2000.

"IBM Mainframe," www.dmreview.com/whitepaper/WID1002720.pdf Mar. 18, 2005.

"HostBridge and WebSphere: Integrating CICS with IBM's Application Server," a HostBridge White Paper, Jul. 23, 2002, pp. 1-34. Mar. 18, 2005.

"S1215, WWW.IMS or Websphere Working with IMS," Ken Blackman, 39 pp. (date unknown).

"Attunity Connect for Mainframe, Native OS/390 Adapters to Data and Legacy," 2003, pp. 1-3.

"Learning Management Systems XML and Web Services," Finn Gronbaek, IBM Corporation, copyright 2001, Apr. 20, 2003, pp. 1-29.

James Martin, "Principles of Object-Oriented Analysis and Design", Oct. 29, 1992, Chapters 1-22.

"Quarterdeck Mosaic User Guide", 1995, Chapters 1-7.

Starkey, "XML-Based Templates for Generating Artifacts from Java-Based Models," Research Disclosure, Dec. 1998, pp. 1678-1680.

"MFS XML Utility Version 9.3.0 User's Guide and References", 57 pages, IBM Corporation, ftp://ftp.software.ibm.com/software/data/ims/toolit/mfswebsupport/mfsxml-v3.pdf, 2003.

Blackman, "IMS eBusiness Update", IMS V8 Roadshow, 11 pages, IBM Corporation, http://www-306ibm.com.software/data/ims/shelf/presentation/oneday/IMSeBusinessUpdate2003.pdf, 2003.

Cover et al., "Web Services User Interface (WSUI) Initiative", http://xml.coverpages.org/wsui.html, Oct. 29, 2002.

Jantti, "Solutions for IMS Connectivity", Abridged from "IMS Connectivity in an On Demand Environment: A PracticalGuide to IMS Connectivity" Redbook (SG246794), 15 pages, (referred to as "http://www,-1.ibm.com/support/docview.wss?uid=swj27009204&aid=1, Feb. 2006" is U.S. Appl. No. 10/668,740.

Cover, Editor, Web Services for Interactive Applications (WSIA). [Web Services Component Model (WSCM)], http://xml.coverpages.org/wscm, Jan. 21, 2002, printed Oct. 31, 2007, 4 pages.

"IMS Connector for Java, User's Guide and Reference", IBM VisualAge for Java, Version 3.5, 9 pages, IBM, 2002.

PR Newswire, Sterling Commerce Announces Availability of First Data Transformation Engine to Support Both XML and Traditional EDI Standards, ProQuest May 12, 1999, pp. 1-3.

"What Web Services Are Not", www.webreference.com/xml/column50, 2003.

"Web Services", www.webopedia.com/TERM/W/Web_services.html, 2003.

Creating WSDL and a Proxy Client From A Web Service, www.westwind.com/webconnection/docs/_08413NI2E.htm, 2002.

"Requirements for Building Industrial Strength Web Services: The Service Broker", http://www.theserverside.com/tt/articles/article.tss?I=Service-Broker, Jul. 2001.

Application Development/Enablement, http://www.306.ibm.com/software/data/ims/presentation/five/trends2003/HTML/indexp15.htm Nov. 11, 2003.

Jouko Jantii et al., "IMS Version 9 Implementation Guide", ibm.com/redbooks, pp. 139-143.

* cited by examiner

APPARATUS, SYSTEM, AND METHOD FOR AUTOMATICALLY GENERATING A WEB INTERFACE FOR AN MFS-BASED IMS APPLICATION

BACKGROUND OF THE INVENTION

1. Field of the Invention

The invention relates to web applications. Specifically, the invention relates to apparatus, systems, and methods for automatically generating a web interface for an MFS-based IMS application.

2. Description of the Related Art

Computer and information technology continues to progress and provide tools that allow software applications to interact more easily than in the past. For example, web applications and web services have been introduced recently to allow a client application such as a ubiquitous web browser to communicate over a world wide network, such as the World Wide Web, with a server application programmed to provide a variety of services include banking, shopping, remote access, database access, and the like.

To control costs, web applications and web services interface with other computer and information technology which remains largely unchanged. For example, large corporations, governments, and other entities continue to use legacy applications such as software programs designed, written, and maintained for large, mission-critical computers, such as mainframes. These entities have invested large amounts of work and money into developing and maintaining the legacy applications. In addition, these applications have been tested and refined to operate very efficiently and with minimal errors.

Legacy applications continue to be used for managing a high percentage of the everyday transactions and data for these businesses. One example of legacy applications in wide-spread use are Message Format Service-based Information Management System applications (hereinafter MFS-based IMS applications). MFS is a component of the transaction management module for IMS. MFS translates transaction messages between various devices and the MFS-based IMS application which typically runs on a host such as a mainframe computer.

Converting or upgrading MFS-based IMS applications to the latest technologies and standards, such as web applications and web services, is often costly and/or impractical. Instead, components are built to translate messages between software applications executing modern standards and technologies and the MFS-based IMS applications.

For example, web interfaces may be constructed that convert between web messages utilizing Hyper Text Markup Language (HTML), eXtended Markup Language (XML), and/or Simple Object Access Protocol (SOAP) and proprietary transaction messages used by MFS-based IMS applications. In this manner, MFS-based IMS applications benefit from the new standards and technologies without making any changes to the MFS-based IMS applications themselves.

Proprietary transaction messages used by MFS-based IMS applications insulate the MFS-based IMS application from the differences in characteristics and layout among different device types and device features that cooperate to provide an interface for the MFS-based IMS application. The device features interfacing with MFS-based IMS applications may include hardware and software including different terminals, keyboards, mouse devices, monitors, light pens, touch screens, card readers, and the like. Instead of device specific code in each MFS-based IMS application, a common MFS control block known as a Message Input Description (MID) and Message Output Description (MOD) is defined for the different device types.

The MID and MOD define how the input or output messages are formatted and laid out for the specific input/output device. MFS supports a plurality of device types including the IBM 3270 terminal. MFS uses the MIDs/MODs to manage interface information such as field formats, field layouts, input devices, and the like. Because MFS manages the interface specific information, the MFS-based IMS application can focus on business logic that utilizes the inputs and outputs.

As mentioned above, a web interface allows non-MFS based IMS applications including web clients to interface with MFS-based IMS applications for implementing e-commerce requirements such as web enablement and/or web services. Non-MFS based IMS applications such as a browser send HTML/XML messages to the web interface, which alone or in conjunction with other components provides messages in the MID/MOD format to the MFS-based IMS application. However, MFS-based IMS applications typically support a large number of devices, which means that a corresponding large number of MIDs/MODs are defined. The web interface needs to know which MID and associated Device Input Formats (DIFs) and which MOD and associated Device Output Formats (DOFs) define an application interface for the associated MFS-based IMS application.

These MIDs and MODs specific to a MFS-based IMS application may be defined in an XMI (XML Metadata Interchange) file. The web interface uses the XMI files to convert an XML or HTML input message from a non-MFS based IMS application, such as a servlet, Java bean, SOAP, or browser client application, into the appropriate MFS input and output messages to communicate with the MFS-based IMS application.

Using XMI files, the web interface performs the run-time conversion of HTML/XML messages into suitable MID/DIF and MOD/DOF messages and vice versa. In addition, a web services description tool may use the XMI files to produce a description of the web service suitable for a web services directory such as a Uniform Description, Discovery, Integration (UDDI) directory. The web services description tool formats the web services description into a Web Services Description Language (WSDL) file.

Conventional tools exist for building web interfaces to MFS-based IMS applications. These tools produce servlets or Common Gateway Interface (CGI) applications which serve as a "bridge" between the client browser or application and a back-end legacy application such as MFS-based IMS application. Due to the complexity and potential number of MFS source files involved in generating a web interface for an MFS-based IMS application, these conventional tools involve a step-by-step Graphical User Interface (GUI) (i.e. a wizard). A user executes the GUI to create a web interface for a single MFS-based IMS application.

Unfortunately, conventional tools for generating a web interface require a user to manually step through each of the windows and enter basic information for generation of a web interface for a single MFS-based IMS application. The GUI wizard must be restarted to create a web interface for another MFS-based IMS application. Repetitively navigating each GUI window can be tedious for a user tasked with generating multiple web interfaces in a relatively short time period. In addition, because the client application (typically a browser) using the web interface remains substantially constant for each MFS-based IMS application, the data entered in each window of the GUI wizard is substantially the same. Tedious data entry of substantially the same information can cause the user to lose concentration and make mistakes.

GUI window based wizard tools for generating a web interface to an MFS-based IMS application may be helpful for a novice. However, a large number of administrators of MFS-based IMS applications have extended experience and intimate knowledge regarding the MID and associated MODs supported by the MFS-based IMS application. These administrators may manage hundreds of different MFS-based IMS applications, each having hundreds or thousands of associated MFS source files. The time required for such an administrator to use a conventional GUI wizard to generate the web interface for each of the MFS-based IMS applications becomes very burdensome.

In addition, certain GUI tools for generating a web interface simply convert the MFS source files into XMI files. Consequently, a second tool, often a GUI interface, must be run to generate a middleware application such as a servlet for interfacing with the MFS-based IMS application. Alternatively, the web interface GUI may be integrated within a larger GUI or Integrated Development Environment (IDE) that generates the servlet or other suitable middleware. Additional GUI tools for generating the servlet or middleware exacerbate the tedious nature of the GUI interface discussed above.

Finally, conventional GUI tools generate a web interface including a plurality of XMI files and/or middleware such as a servlet and store these in a directory. Next, the user must deploy these components to the webserver and or back-end computer system to make the web interface available to the client applications. Conventionally, this step may also include an additional GUI interface.

Accordingly, a need exists for an apparatus, system, and method for automatically generating a web interface for an MFS-base IMS application. In particular, the apparatus, system, and method should automate the generation of XMI files used for the web interface, servlets, and deployment of the generated components to the appropriate servers in response to a single input. The apparatus, system, and method should also automatically generate a web interface for a plurality of MFS-based IMS applications during a single execution session.

SUMMARY OF THE INVENTION

The present invention has been developed in response to the present state of the art, and in particular, in response to the problems and needs in the art that have not yet been met for automatically generating a web interface for an MFS-based IMS application. Accordingly, the present invention has been developed to provide an apparatus, system, and method for automatically generating a web interface for an MFS-based IMS application that overcome many or all of the above-discussed shortcomings in the art.

An apparatus according to the present invention includes an import module, a metadata generator, and a code generator. The import module imports MFS-based IMS source files corresponding to an MFS-based IMS application. The MFS source files may be local or imported from a remote storage location. The metadata generator stores a standardized metadata description of the MIDs/DIFs and MODs/DOFs. The code generator generates a middleware application that interfaces between a client application and the MFS-based IMS application. The middleware application is generated using the standardized metadata description.

In addition, the apparatus may include a parser that parses each MFS source file into one or more MID/DIF pairs and one or more MOD/DOF pairs. The parser may provide the MID/DIF pairs and MOD/DOF pairs to the metadata generator. The apparatus may also include a command-line interface which allows a user to generate a web interface for one or more MFS-based IMS applications in response to single input. In certain embodiments, the apparatus includes a deployment module that automatically stores the standardized metadata description and middleware application in one or more repositories.

A method of the present invention is also presented for automatically generating a web interface for an MFS-based IMS application. In one embodiment, the method includes importing MFS-based IMS source files corresponding to an MFS-based IMS application. Next, at least one XMI file associated with the imported MFS-based IMS source file is generated for the MFS-based IMS application. Then, a middleware application is generated from the at least one XMI file. The middleware application is configured to interface between a client application and the MFS-based IMS application. The method may further include deploying the at least one XMI file and middleware application to servers configured to enable transactional communication between a client application and the MFS-based IMS application.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
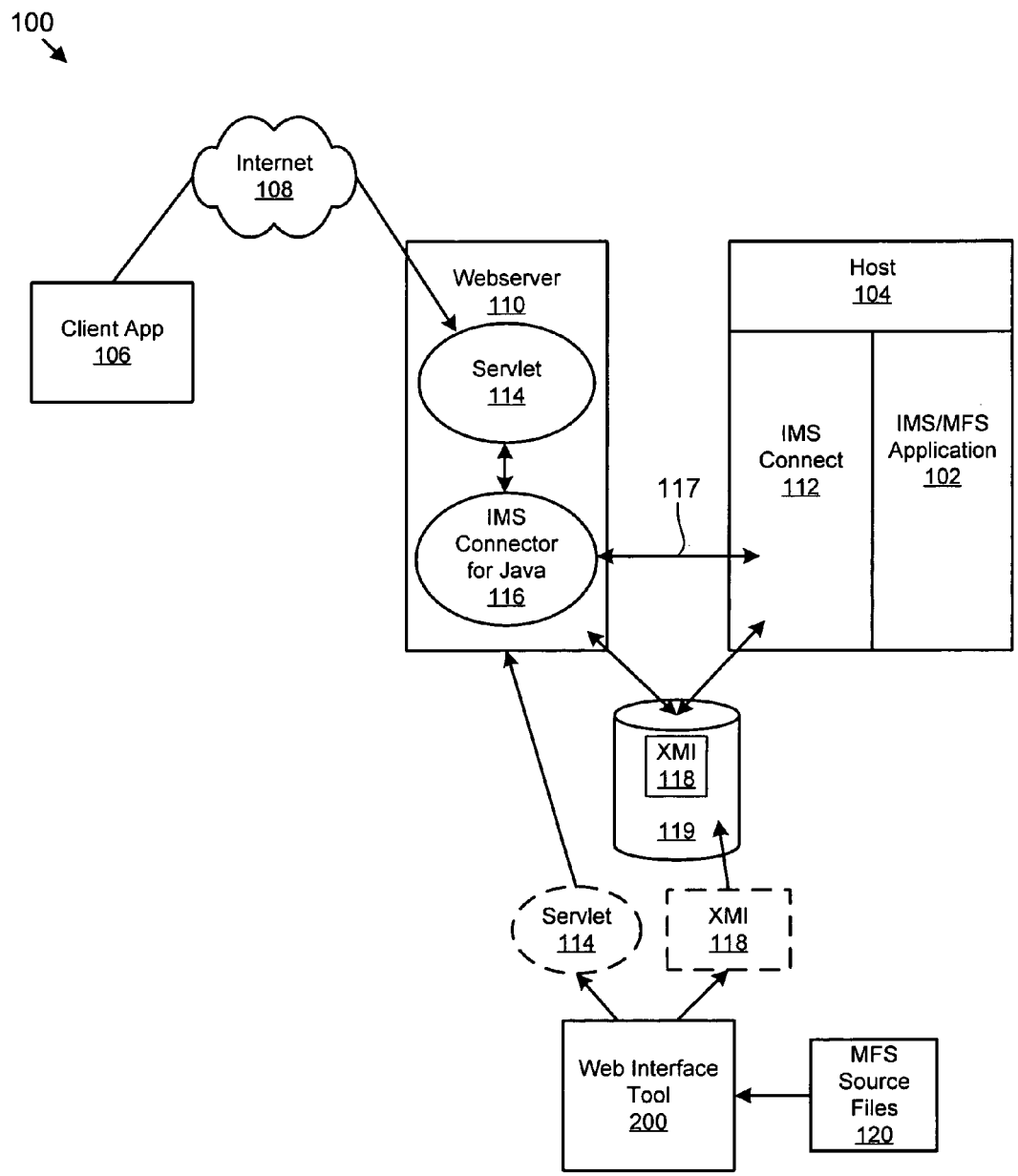
FIG. 1 is a schematic block diagram illustrating one embodiment of a representative system suitable for utilizing the present invention.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. As used herein, "web application" refers to any application capable of communicating with a client application over a public network such as the World Wide Web (WWW) or Internet using well known protocols such as Transmission Control Protocol/Internet Protocol (TCP/IP), HTML, XML, and the like. The "web application" may be built specifically for communication over the WWW or Internet or comprise additional software modules that allow communication with the software application over the WWW or Internet.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a schematic block diagram of one embodiment of a representative system 100 suitable for utilizing the present invention. The system 100 depicts a run-time environment that includes a web interface for a MFS-based IMS application 102. The MFS-based IMS application 102 operates within a host 104.

Typically, the host 104 is a mainframe computer operating a mainframe operating system such as Multiple Virtual Storage (MVS) or OS/390. Alternatively, the host 104 may comprise a computer system running the zSeries/Operating System (z/OS). As mentioned above, the MFS-based IMS applications 102 are typically older, more mature software applications that provide mission-critical operations for a business, government, or organization. The MFS-based IMS application 102 completes transactions and communicates with users of terminal devices such as the IBM 3790 (not shown) by way of MID and MOD messages.

Recently, components have been built which allow the MFS-based IMS application 102 to interface with client applications 106 over the Internet 108 to provide a web interface to the MFS-based IMS application 102. The MFS-based IMS application 102 continues to use MID and MOD messages with associated device information. The client applications 106 use modern technologies such as HTML, XML, and SOAP messages. The client applications 106 may be conventional web browsers or XML, SOAP, or Enterprise Java Beans (EJB) clients.

Web interfaces and web enablement represent an evolution in e-business and e-commerce. Web enablement allows an application to communicate with a client application 106 in almost any geographic location. Businesses can use web interfaces to continue use of dependable legacy applications with minimal additional expense.

Typically, web interfaces comprise one or more middleware application components that cooperate such that an MFS-based IMS application 102 can communicate with a client application 106. In certain embodiments, the system 100 provides middleware such as a servlet that allows an MFS-based IMS application 102 on a host 104 to communicate with a webserver 110 which in turn communicates with the client application 106.

The system 100 may include a web server 110, an IMS Connect component 112, a servlet 114, an IMS Connector for Java 116 component, and a web interface tool 200. The web server 110 communicates request and response messages between client applications 106 and an MFS-based IMS application 102 using IMS Connector for Java 116 and the servlet 114. The request and response messages are communicated using conventional protocols, such as Hyper Text Transfer Protocol (HTTP), XML, SOAP, and the like.

Typically, the web server 110 executes an IMS Connector for Java 116 which is designed to establish connectivity between the web server 110 and an IMS Connect component 112. The servlet 114 produces an input HTML/XML form which is sent to the client application 106 such as a browser for input data and an output HTML/XML form which is sent to the client application 106 for output data from an MFS-based IMS application.

The servlet 114 cooperates with the IMS Connector for Java 116 and the IMS Connect component 112 to provide an interface between the client application 106 and a specific MFS-based IMS application 102. The servlet 114 converts the messages based on predefined MIDs/DIFs and MODs/

DOFs. The converted messages are provided to the IMS Connector for Java which sends MFS messages in accordance with the MIDs/DIFs and MODs/DOFs identified by the servlet 114 to IMS Connect 112.

The IMS Connector for Java 116 communicates the MFS messages to the IMS Connect component 112 as a byte stream 117. The IMS Connect component 112 provides the byte stream to the MFS-based IMS application 102. The input byte stream communicated to the MFS-based IMS application 102 is formatted according to a specific MID, and an output byte stream from the MFS-based IMS application 102 corresponds to one or more MODs by IMS Connect 112. In order to properly format and parse the byte stream, the IMS Connect 112 references XMI files 118.

Typically, XMI files 118 reside within a repository 119, such as a database or a location on a storage device. The repository 119 may be accessible to both the webserver 110 and IMS Connect 112. Alternatively, the XMI files 118 may be stored on both the webserver 110 and IMS Connect 112. The XMI files 118 define how raw data, data fields, and data types map between an MFS file and an MFS XML file. The MFS XML file includes data formatted for a specific MID. The MFS XML file also includes data formatted for one or more MODs associated with the specific MID.

The MFS XMI file 118 provides IMS Connect 112 with the necessary information to properly convert the user data into a native format recognized by the MFS-based IMS application 102. In addition to the standard data type encoding for MFS-based IMS applications 102, the native MFS format pertains to data length and data order. IMS Connect 112 looks up information using the XMI files 118 for the length of each data field as well as the expected data order for the appropriate MFS-based IMS application 102. IMS Connect 112 then sends an appropriately formatted data stream (not shown) to the MFS-based IMS application 102.

Similarly, data from the MFS-based IMS application 102 is processed by the IMS Connect 112 using the XMI files 118 to produce the byte stream 117. The byte stream 117 is sent via IMS Connector for Java 116 to the servlet 114 for further processing. The servlet 114 receives the byte stream 117 and converts the data into HTML to send to the client application 106 according to the device format information in the XMI files 118.

XMI files 118 include a MID and a corresponding DIF, at least one MOD and a corresponding DOF, and an MFS table. Accordingly, IMS Connect 112 may access as many as three different XMI files 118 to provide translation of an XML file into an MFS XML file. XMI files 118 describe messages definitions, device definitions, and the relationships between them for handling MFS messages.

XMI files 118 contain data field length information from the message field portion of original MFS code. IMS Connect 112 uses this information from XMI 118 to correctly allocate the necessary amount of space for each field to send to the MFS application 102 for inbound messages. IMS Connect 112 uses the same length information on the outbound message to determine the boundary of each output field. XMI files 118 also contain device field information that specifies the layout position of each output field. The layout position information is used by the servlet 114 to display the output data in the correct location on the screen.

XMI files 118 comprise a standardized metadata description of MIDs/DIFs and MODs/DOFs of an MFS-based IMS application. The XMI files 118 satisfy the standard formatting and semantics of the XML Metadata Interchange standard as set forth by the Object Management Group (OMG) which is a standard combining the Uniform Modeling Language (UML) and Meta Object Facility (MOF) standards.

Because XMI files 118 define the MID/MOD interface understood by MFS-based IMS applications 102, the XMI files 118 also define a web services interface. In addition, XMI files 118 may be used to automatically generate a servlet 114 for the MFS-based IMS application 102. Of course the XMI file may be used to generate middleware other than servlets 114 as well. The middleware may include multiple components that are installed on different servers.

As mentioned above, conventional tools allow for generation of XMI files 118 and a servlet 114 to define a web interface for an associated MFS-based IMS application 102. However, this process is lengthy, tedious, and cumbersome when many MFS source files 120 must be converted to XMI files 118 and/or when web interfaces are to be generated for multiple MFS-based IMS applications 102. The web interface tool 200 addresses the problems faced in the art in generating web interfaces for MFS-based IMS applications 102.

Figure 2:
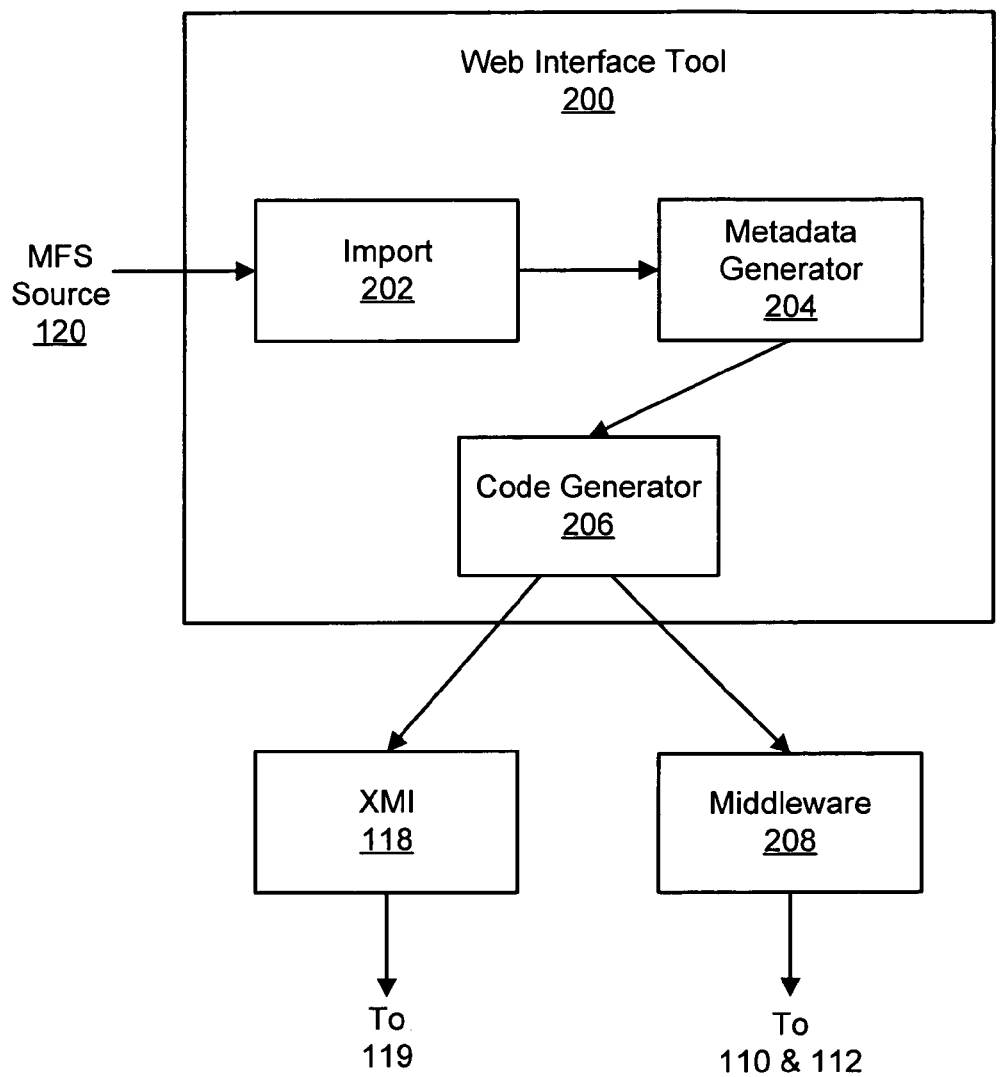
FIG. 2 is a logical block diagram illustrating one embodiment of a web interface tool in accordance with the present invention.

FIG. 2 illustrates a schematic block diagram of one embodiment of a web interface tool 200 in accordance with the present invention. The web interface tool 200 includes an import module 202, a metadata generator 204, and a code generator 206. These components cooperate to allow a user to automatically generate XMI files 118 and one or more middleware applications to serve as web interfaces for one or more MFS-based IMS applications 102.

The import module 202 is configured to import MFS source files 120 from a remote storage device, such as a hard drive accessible over a network. The MFS source files 120 correspond to a particular MFS-based IMS application. In certain embodiments, the import module 202 identifies the MIDs/DIFs and MODs/DOFs as well as associations between them from the MFS source files 120.

MIDs and MODs relate to one or more specific device types. In a mainframe environment, the MIDs and MODs allow a single MFS-based IMS application to perform transactions for end-users of different hardware device types, including terminals, desktop computers, workstations, and the like. Alternatively, MIDs/MODs may be defined to provide different layouts for data fields.

Each MID and MOD has a corresponding Device Input Format (DIF) and Device Output Format (DOF). The DIF/DOF respectively define characteristics about the specific input devices and output devices. The input devices and output devices comprise components such as specific types of keyboards, mouse devices, monitors, light pens, touch screens, card readers, and the like. The peripheral input devices and output devices associated with a type of end-user device type are referred to as device features. A specific device type and device feature comprise a device type and device feature combination.

In certain embodiments, the metadata generator 204 generates a standardized metadata description 118 for the MIDs/DIFs and MODs/DOFs provided by the import module 202. Alternatively, a proprietary metadata description for the MIDs/DIFs and MODs/DOFs may be generated. Preferably, the standardized metadata description is a file that complies with the standards for an extensible Markup Language Metadata Interchange (XMI) file. As mentioned above, XMI files may be used to provide web services as well as generate middleware applications to build a web interface. Preferably, the XMI files are static and stored for future use by a middleware application or a web service.

The XMI file comprises data relating to the MID/DIF and MOD/DOF as well as modeling information related to the software application that uses the MID/DIF and MOD/DOF.

Consequently, the metadata generator 204 may generate an XMI file for each MID/DIF pair and MOD/DOF pair. Typically, because the client application 106 is a software module such as a browser or a web service consumer, the DIF and DOF which relate to hardware devices do not apply. Consequently, the DIF and DOF information may be ignored by the metadata generator 204 and not included in the XMI files.

In another embodiment, the metadata generator 204 may only generate XMI files for particular MIDs/DIFs and MODs/DOFs identified by input parameters to the web interface tool 200. One input parameter may specify a device type that is associated with one or more MIDs/MODs. Consequently, the metadata generator 204 may generate XMI files just for the MIDs and MODs associated with the device type. Alternatively, the device type may default to the first device type in an ordered list of device types supported by the MIDs/MODs.

Preferably, one or more input parameters are provided to the web interface tool 200 by a single input. The single input may be a string which includes multiple parameters or a script that lists the parameters. Alternatively, a user may be prompted to enter each parameter.

Once the XMI files 118 are successfully generated, a code generator 206 uses the standardized metadata description, XMI files 118 in one embodiment, to generate a middleware application 208 corresponding to the MFS-based IMS application 102. The code generator 206 may generate the middleware application 208 in the form of source code, object code, or machine interpretable code such as Java byte code. The middleware application 208 provides a software interface between a client application 102 and a corresponding MFS-based IMS application. To generate a middleware application 208 for a second MFS-based IMS application, the web interface tool 200 begins again with the import tool 202 and a set of MFS source files 120 associated with the second MFS-based IMS application.

Once the web interface tool 200 generates the standardized metadata descriptions 118 and middleware application(s) 208. The standardized metadata descriptions 118 are stored in an XMI repository 119. The middleware application(s) 208 are installed on a server such as a webserver 110 and/or a webserver interface such as IMS Connect 112. This may be accomplished by manually transmitting and installing the files. Alternatively, certain embodiments of the present invention include components for deploying the standardized metadata descriptions 118 and middleware application(s) 208 to the servers.

Figure 3:
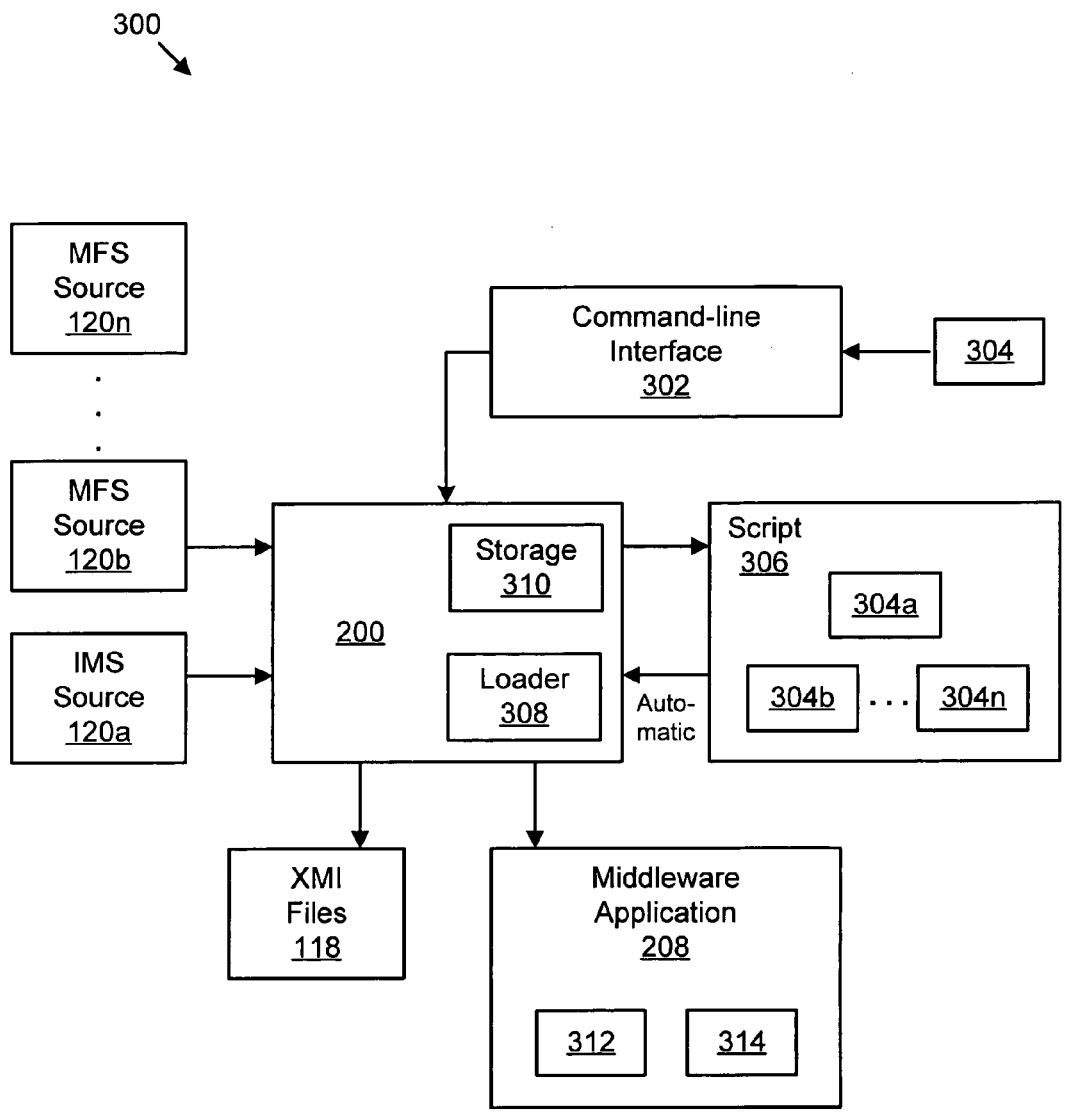
FIG. 3 is a schematic block diagram illustrating one embodiment of an apparatus in accordance with the present invention.

FIG. 3 illustrates one embodiment of an apparatus 300 in accordance with the present invention. As mentioned above, one of the challenges in the art is that web interfaces must be created using a step-by-step GUI wizard type tool which requires parameters to be entered each time the wizard is executed. In addition, the wizard must be executed separately for each web interface a user desires to create. Furthermore, a separate GUI wizard must be used to generate middleware applications 208.

To resolve these challenges, the apparatus 300 includes a command-line interface 302. The command-line interface 302 is configured to execute the web interface tool 200 in response to a parameter set 304 provided as a single input. Command-line interfaces 302 typically comprise a text-based interface in which a command line is presented to a user. The user may initiate execution of an application such as a web interface tool 200 by including a single parameter set, usually typed on a single line.

The command-line interface 302 allows users who need little or no instructions as to what parameters may be specified in the parameter set 304, which parameters are required, which parameters are optional, and the like to quickly initiate the web interface tool 200 using a minimal number of keystrokes. Consequently, a command-line interface 302 saves time over conventional GUI interfaces. In certain embodiments, the web interface tool 200 may be initiated with the single parameter set 304 being supplied by another program such as a scheduled batch program or other automated system configured to communicate at least one parameter set 304 to the command-line interface 302.

The command-line interface 302 passes a parameter set 304 to the web interface tool 200. The web interface tool 200 then imports the MFS source files 120a . . . 120n identified in the parameter set 304. As discussed above in relation to FIG. 2, XMI files 118 and a middleware application 208 are then generated.

In certain embodiments, a parameter set 304 may include parameters and/or whole parameter sets 304. One parameter set 304 may include parameters for a plurality of MFS-based IMS applications. These parameters may be provided in a single line as a single input to the command-line interface 302. The single parameter set 304 may comprise a script 306 that includes a plurality of parameter sets 304.

The web interface tool 200 may include a loader 308 configured to load one or more parameter sets 304 from the script 306. In one embodiment, the loader 308 loads one parameter set 304a, b, . . . n at a time. For each parameter set 304a, b, . . . n, the web interface tool 200 generates a separate set of XMI files 118 and a middleware application 208 configured for a different MFS-based IMS application 102.

Preferably, the script 306 is stored in persistent storage such as a file on a disk drive. The script 306 may comprise a proprietary format or a simple text file in which each pair of lines comprise a single parameter set 304. As a text file, the script 306 allows a user to readily modify the script 306. Alternatively, the script 306 comprises a persistent data structure such as tables or records in a database.

In certain embodiments, the command-line interface 302 allows a user to enter each parameter in a parameter set 304 manually. One or more of the parameters may be entered in response to prompts from the command-line interface 302. Once all the parameters for generating the XMI files 118 and middleware application 208 are entered, the command-line interface 302 may prompt a user to store the manually entered parameters as a parameter set 304 in persistent storage, such as a script 306. A storage module 310 of the web interface tool 200 may cooperate with the command-line interface 302 to store the manually entered parameters as a script 306.

Once stored, manually entered parameter sets 304 may be loaded automatically by the loader 308 in response to a single input in the command-line interface 302. For example, a user may provide a single input such as a filename for a script 306 in the command-line interface 302. In response, the command-line interface 302 activates the web interface tool 200 which loads the identified script 306.

FIG. 3 illustrates a middleware application 208 generated by the web interface tool 200. The web interface tool 200 generates a middleware application 208 compatible with the server(s) that will execute the middleware application 208. Preferably, the middleware application 208 is substantially hardware and operating system independent. In one embodiment, the middleware application 208 comprises Java byte code.

In one embodiment, the middleware application 208 comprises a server component 312 and a back-end component 314. The server component 312 may execute on a webserver 110 and communicate with the back-end component 314 operating on a host 104. For example, the back-end component 314 may execute within an IMS Connect module 112 of a mainframe computer. The server component 312 and a back-end component 314 are configured to exchange messages to provide a web interface between a client application 106 and an MFS-based IMS application.

Figure 4:
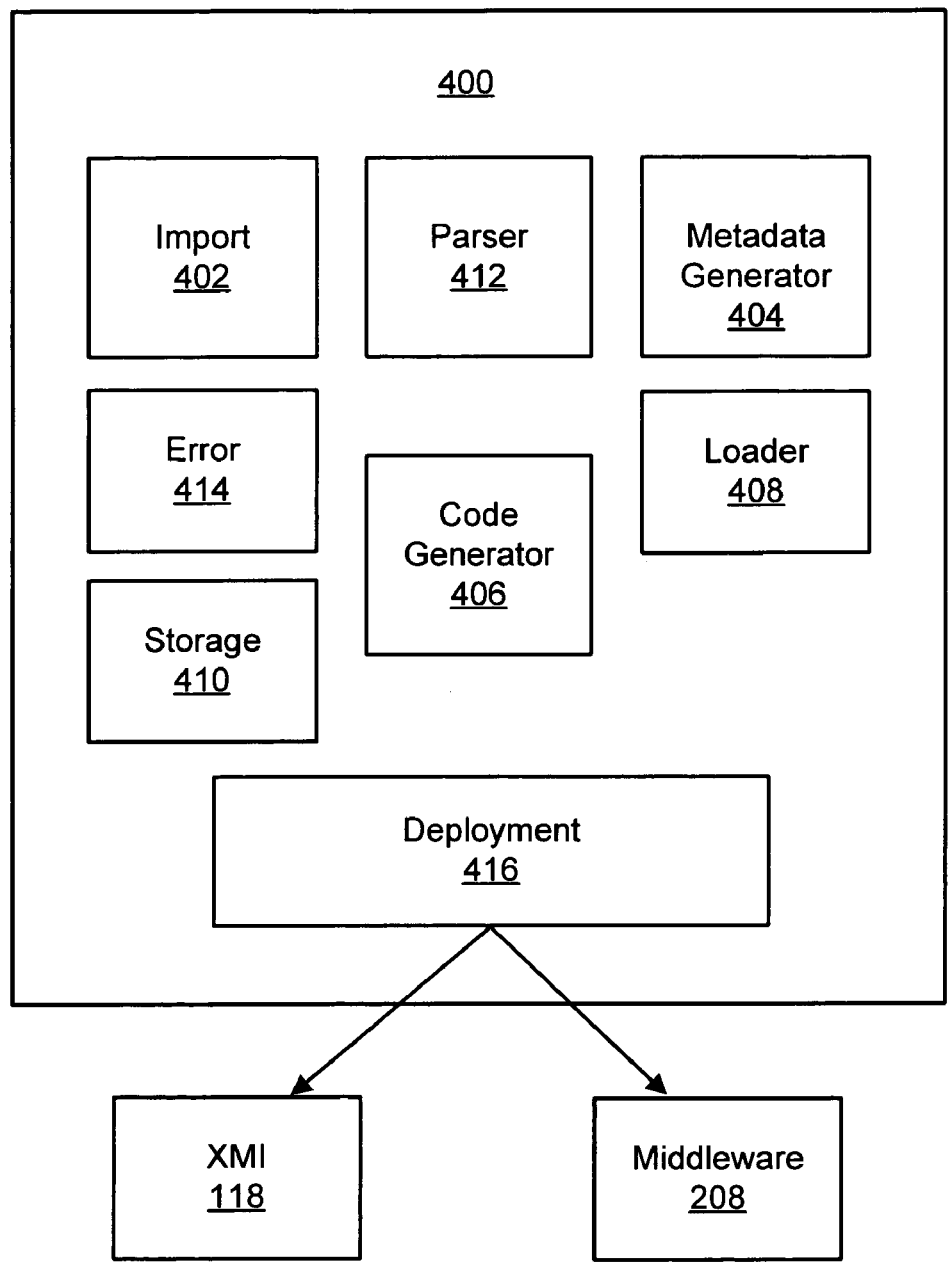
FIG. 4 is a schematic block diagram illustrating a system in accordance with the present invention.

FIG. 4 illustrates an embodiment of a utility 400 for automatically generating a web interface for an MFS-based IMS application in accordance with the present invention. The utility 400 includes an import module 402, a metadata generator 404, a code generator 406, a loader 408, and a storage module 410.

The import module 402 is very similar to the import module 202 described in relation to FIG. 2. However, the import module 402 does not parse the MFS-based IMS source files 120. Instead, a parser 412 parses the MFS-based IMS source files 120 imported by the import module 402. The metadata generator 404, code generator 406, loader 408, and storage module 410 function substantially similar to the metadata generator 204, code generator 206, loader 308, and storage module 310 described in relation to FIGS. 3 and 4.

The parser 412 is configured to parse a plurality of MFS source files 120 to accommodate MFS MIDs and MODs stored in multiple MFS source files. The parser 412 comprises a symbol table (not shown) and grammar (not shown) suitable for properly identifying the MIDs/DIFs and MODs/DOFs as well as associations between them. Preferably, the MIDs/DIFs, MODs/DOFs, and associations between them are organized into data structures in memory such as software objects, arrays, linked lists, or the like.

The utility 400 also includes an error module 414. The error module 414 is configured to present an error message in response to an error condition triggered by the import module 402, metadata generator 404, code generator 406, loader 408, or storage module 410. As components perform their function, error conditions may arise. For example, a parameter filename may not be locatable in the indicated directory, a MFS source file 120 may be unparsable, as well as various other error conditions that may arise.

The error module 414 may be configured to present the error message in take various steps to remedy the error. If the utility 400 communicates with a command-line interface 302, the error module 414 may present the error message as a text message on a display. Alternatively, or in addition, the error module 414 may also write a log to record the error message and state of the utility when the error occurred.

If the utility 400 can continue and successfully generate the appropriate XMI files 118 and middleware application 208 based on the parameter set 304, the error module 414 may simply report the error message and then allow the utility 400 to continue operation. If the error is such that the utility can not produce proper XMI files 118 and/or a middleware application 208, the error module 414 may automatically abort the generation of web interface(s) for the MFS-based IMS applications. Alternatively, if the error affects generation of a single web interface, the error module 414 may automatically permit the utility 400 to continue generating web interfaces for MFS-based IMS applications associated with other parameter sets 304 unaffected by the error condition. In certain embodiments, the error module 414 may prompt a user regarding how the user wants to proceed in generating web interface(s) after an error condition.

In certain embodiments, the utility 400 includes a deployment module 416. The deployment module 416 deploys the XMI files 118 and middleware application 208 to one or more servers. Alternatively, the deployment module 416 may deploy the XMI files 118 and middleware application 208 to a repository such as a database or a staging area to facilitate establishing a web interface.

The deployment module 416 manages transfer and installation of the XMI files 118 and middleware application 208 such that communication is enabled between a client application 106 and a corresponding MFS-based IMS application 102. Preferably, the deployment module 416 automatically logs into the appropriate server and transfers the standardized metadata descriptions such as XMI files 118 and source files for the middleware application 208 onto the server.

In certain embodiments, the XMI files and middleware application 208 are to be installed on different servers. In addition, the middleware application 208 may comprise multiple components such as a server component 312 and a back-end component 314 that are to be installed on different servers. The deployment module 416 is configured to coordinate the installation and copying of the appropriate components to the proper servers. In one embodiment, the deployment module 416 comprises a File Transfer Protocol (FTP) client configured to move/copy the XMI files and files for the middleware application 208 using the FTP communication protocol.

Consequently, the deployment module 416 saves a user such as a system administrator responsible for generating and implementing a plurality of web interfaces for MFS-based IMS applications a significant amount of time. The user need only provide the proper parameter set 304. The utility 400 automatically generates the XMI files and middleware application 208 and installs these on the appropriate servers to implement the newly generated web interface(s). Such automation is useful for quickly generating a web interface for MFS-based IMS applications where the MFS source files 120 are frequently updated such that the corresponding web interface must also be updated.

Figure 5:
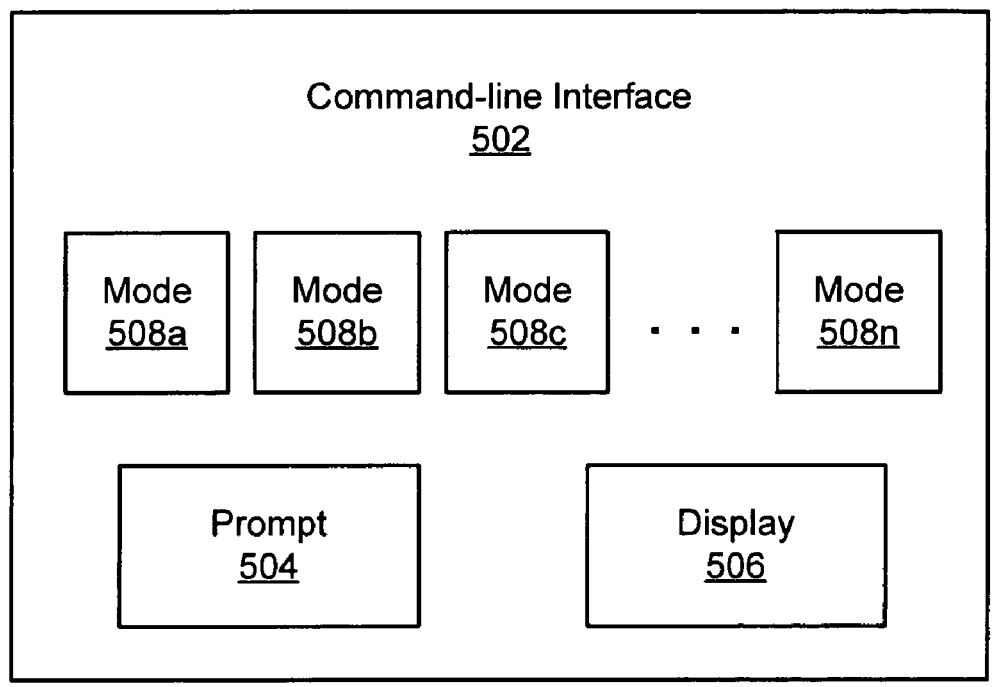
FIG. 5 is a schematic block diagram illustrating a command-line interface in certain embodiments of the present invention.

FIG. 5 illustrates one embodiment of a command-line interface 502. The command-line interface 502 includes a prompt module 504 and a display module 506. The prompt module 504 cooperates with the display module 506 to present a command line to a user. The user may type text on the command line to instruct a web interface tool 200 or web interface utility 400 to begin automatically generating a web interface for an MFS-based IMS application 102.

Typically, a user types the name of the web interface tool 200 or web interface utility 400 followed by a series of one or more parameters in a single parameter set 304. The single parameter set 304 comprises a single input to the command-line interface 502. The parameters may be separated by flags indicating the type of parameter that follows the flag. For the web interface tool 200 or web interface utility 400 to properly generate XMI files 118 and a middleware application 208 and deploy these to the proper servers, certain parameters are required, others are optional, and still others receive default values if not specified by the user.

In response to the parameter set 304, the web interface tool 200 or web interface utility 400 begin building the web interface. As the web interface tool 200 or web interface utility 400 operates, feedback may be provided to a user through the display module 506. For example, as various stages of automatically building the web interface are complete, the web interface tool 200 or web interface utility 400 may use the display module 506 to notify a user of the progress. Similarly, if an error condition is detected by an error module 414, an error message may be presented to the user using the display module 506. Of course progress messages and error messages may be written to a log file instead of being presented in the command-line interface 502.

In one embodiment, the parameter set 304 comprises parameters for the import module 202/402, parameters for the code generator 206/406 which generates the middleware application, and parameters for the deployment module 416. Alternatively, the present invention may use the prompt 504 to obtain each of the three types of parameters separately.

Parameters for the import module 202/204 pertain to the MFS source files 120 and the device type and device features defined in the MIDs/DIFs and MODs/DOFs of the MFS source files 120. The import module 202/204 only requires a source file parameter identifying the MFS source files 120. The source file parameter may include a filename, a filename and path on a storage device, or a combination of these.

In addition, the source file parameters may comprise a wild card file name and/or a directory path and a wild card designation such as "*.mfs." The wild card designation may cause the import module 202/204 to import a plurality of MFS-based IMS source files 102 in response to this single parameter. Consequently, if the MFS-based IMS source files 102 are grouped in a common directory, the user does not have to specify each MFS-based IMS source file 102 by name.

Other parameters for the import module 202/204 may be optional, or default to predetermined values. For example, the import module 202/204 may accept parameters for a device characteristic table (optional) and whether the MFS source files 120 have been converted between different types of file encoding. (defaults to False)

MFS source files 120 reside on the host 104. A user interface implementing the present invention may operate on a PC or workstation. Accordingly, the MFS source files 120 may be transferred to the PC or workstation using a file transfer program such as FTP which may impose an encoding change on the MFS source files 120 from the original format on the host 104.

Text characters on a host 104 are typically encoded using the Extended Binary Coded Decimal Interchange Code (EBCDIC). In contrast, a PC or workstation typically encodes text characters according to American National Standard Code for Information Interchange (ASCII) code. Consequently, if a binary file is translated into a text file and then transferred from a host 104 to a PC, the text file is now in ASCII format. If an ASCII format file is parsed as an EBCDIC encoded file, the results are dramatically different.

The import module 202/204 may also accept parameters for the source codepage (defaults to setting for text on the machine operating the import module 202/204), the host codepage (defaults to Cp037), the output directory (defaults to current directory), the device type (defaults), and the device feature (defaults). In one embodiment, the device type and device feature default to the first in an alphabetically ordered list of device types and device features identified in the MFS source files 120.

An example of parameters for the code generator 206/406 is set forth in table 1.

TABLE 1

| Input | Required/Optional |
| --- | --- |
| MOD name | Required |
| XMI repository location on web server | Required |
| Styling sheet name | Required |
| Styling sheet location on web server | Required |
| Hostname | Required |
| Port number | Defaults to 9999 |
| IMS name | Required |

TABLE 1-continued

| Input | Required/Optional |
| --- | --- |
| IMS interaction spec verb | Defaults to 'SYNC_SEND_RECEIVE' |
| RACF user name | Optional |
| RACF Group | Optional |
| RACF Password | Optional |

The MOD name is used in the middleware application 208 to identify the MFS-based IMS application the middleware application 208 interfaces with. The XMI repository is typically a pathname indicating where in a webserver 110 the XMI files 118 are to be stored. This pathname together with the styling sheet name and styling sheet location on the web server 110 are used by the middleware application 208 to access the XMI files 118 for generating HTML input files and output files when interfacing between the client application 106 and the MFS-based IMS application 102.

The hostname, port number, IMS datastore name, and IMS interaction spec verb are used by the middleware application 208 to establish a connection with the IMS Connect module 112 and interface with the MFS-based IMS application 102. The Resource Access Control Facility (RACF) username, group, and password are optional and relate to security controls that may be on data used by the MFS-based IMS application 102 in interacting with a client application 106.

An example of parameters for the deployment module 416 is typically related to security parameters required to log into different serves and transfer files. The parameters for the one embodiment of the deployment module 416 are set forth in table 2.

TABLE 2

| Input | Required/Optional |
| --- | --- |
| Host machine name | Required |
| Host login ID | Required |
| Host ID password | Required |
| PDS/E location | Required |
| Server machine name | Required |
| Server login ID | Required |
| Server ID password | Required |
| Local stylesheet | Required |

The host machine name (or IP address), host login ID, and host ID password allow the deployment module 416 to locate and login to the host 104 in order to transfer XMI files 118 to the host 104. The XMI files 118 are stored in a Partition Dataset Extended (PDS/E) location on the host 104. The server machine (or IP address), server login ID, and server ID password are used to establish a connection with an application server such as a webserver 110. The local stylesheet indicates the name of the stylesheet to be sent to the webserver 110 and stored in the location indicated by the styling sheet location parameter collected by the code generator 206/406.

For certain users all of the parameters described above may be well known and routine, consequently entering these into a GUI wizard utility become very tedious. Embodiments of the present invention allow all of these parameters to be set and provided to the web interface tool 200 or web interface utility 400 as a single input.

However, certain users may desire a more interactive role in operating the web interface tool 200 or web interface utility 400. Accordingly, the command-line interface 502 includes a plurality of modes 508a,b, . . . n of operation. Each mode 508a,b, . . . n allows for a different level of interaction between a user and the command-line interface 502. For example, the command-line interface 502 may include a novice mode 508a, an expert mode 508b, and a batch mode 508c. Which mode 508a, b, . . . n the command-line interface 502 uses may be determined by the number and type of parameters initially provided to the command-line interface 502.

If only one parameter or no parameters are provided, the web interface tool 200 or web interface utility 400 may operate in novice mode 508a. The novice mode 508a may be used by users who prefer a high level of interactivity with the web interface tool 200 or web interface utility 400. In novice mode 508a, a user may be prompted for each parameter in a parameter set 304. Required, optional, and default parameters may be prompted for using the prompt 504. In addition, each prompt may include help information such as whether or not the parameter is required, optional, or what a default for the parameter is. The help may also provide additional information on what each parameter is used for. The help information may guide the user in using the web interface tool 200 or web interface utility 400.

If all required parameters are entered at once, the command-line interface 502 operates in expert mode 508b. In expert mode 508b, a user may enter the required parameters on a single line and then wait as the web interface is automatically generated. Typically in expert mode 508b the user includes the desired MOD to properly associate the web interface with the MFS-based IMS application 102. Expert mode requires that a user know what device type and device feature is desired prior to initiating the web interface tool 200 or web interface utility 400. Alternatively, in one embodiment, if the device type and device feature is not provided, the web interface tool 200 or web interface utility 400 may use the first device type and device feature from an alphabetically ordered set of device types and device features found in the MFS source files 120.

Certain users may desire to specify a parameter set 304 using a predefined script 306. The script 306 may include one or more parameter sets 304. For such users, the command-line interface 502 provides a batch mode 508c. In one embodiment, to initiate batch mode, a user includes a parameter flag "-batch" followed by a filename and/or file path to a persistent storage data structure such as a script 306.

Batch mode 508c allows the interface tool 200 or web interface utility 400 to automatically generate a web interface for a plurality of MFS-based IMS applications. In one embodiment, the script 306 is read line-by-line by a loader 308/408. The first line of the script 306 may comprise parameters for the import module 202/402. The second line may comprise parameters for the code generator 206/406 and deployment module 416. Together, the first and second lines may comprise a parameter set 304.

Figure 6:
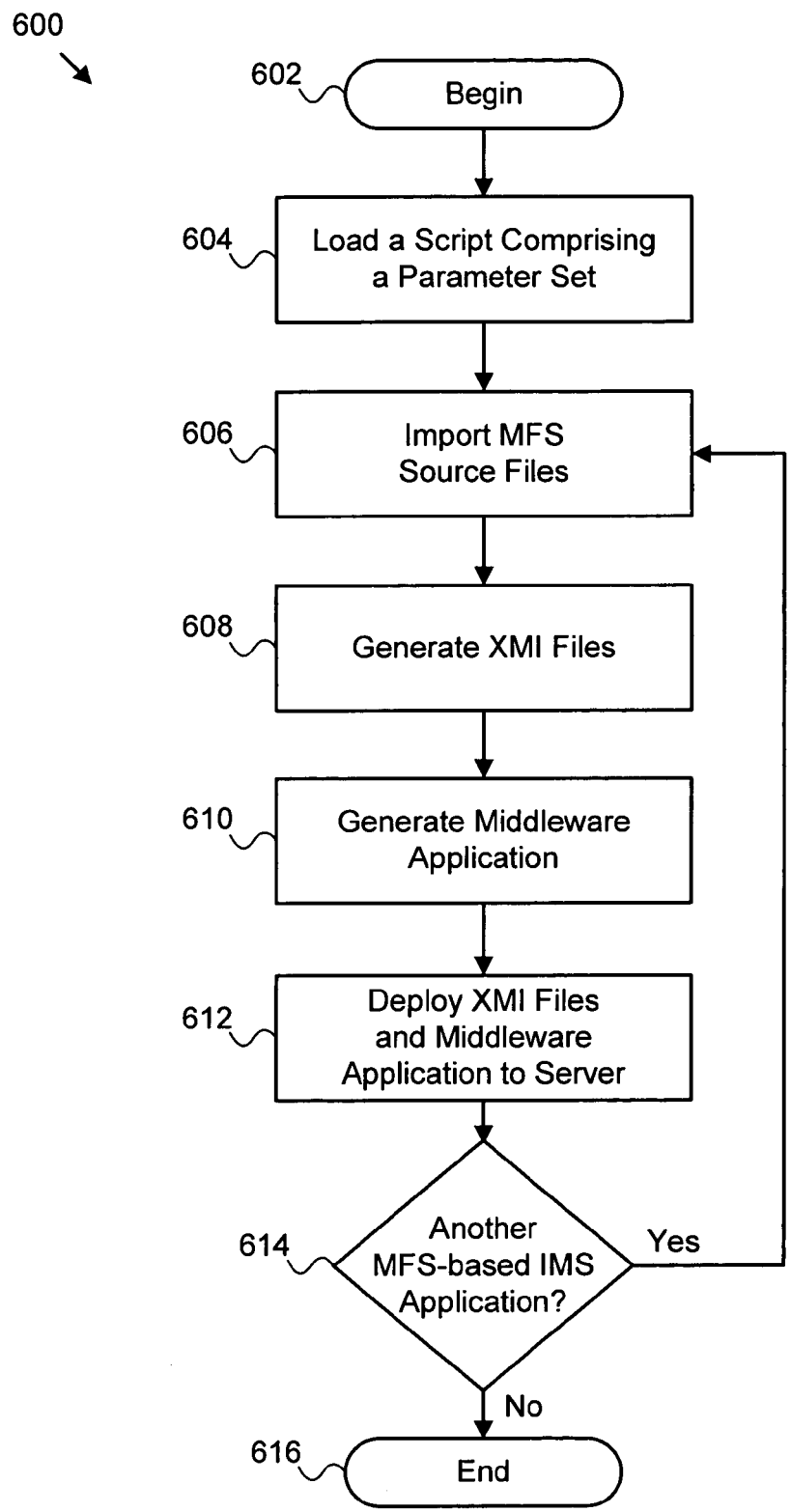
FIG. 6 is a schematic flow chart diagram illustrating a method for automatically generating a web interface for an MFS-based IMS application according to one embodiment of the present invention.

FIG. 6 illustrates a method 600 for automatically generating a web interface for an MFS-based IMS application. In select embodiments, the method 600 may be conducted using the apparatus and/or utility of FIGS. 2-4. The method 600 automates the generation of web interface(s) for one or more MFS-based IMS applications 102.

In one embodiment, the method 600 begins 602 by loading 604 a script 306 comprising at least one parameter set 304. Alternatively, the script 306 may comprise a plurality of parameter sets 304 each associated with a different MFS-based IMS application 102. Next, the MFS source files 120 are imported 606. Preferably, the source files 120 are parsed to identify the MIDs/DIFs and MODs/DOFs as well as associations between them. In certain circumstances, the MFS source files 120 may be converted to accommodate differences in encoding formats. Preferably, a plurality of encoding formats are supported.

Then, a standardized metadata description such as an XMI file is generated 608. Typically, one XMI file 118 is generated 608 for each MID and DIF pair. A second XMI file 118 is generated for a MOD and DOF pair. Next, a middleware application 208 is generated 610 based on the XMI files 118 and parameters provided by a user. The XMI files 118 and middleware application 208 are then deployed 612 to one or more servers such as an application server, or web server 110.

Finally, a determination 614 is made whether a web interface is to be generated for another MFS-based IMS application 102. If so, the method 600 imports 606 the MFS source files 120 associated with the next MFS-based IMS application 102. If not, the method 600 ends 616.

In summary, the present invention provides an apparatus, system, and method for automatically generating a web interface for an MFS-base IMS application without the tedious step-by-step windows and data entry of conventional GUI tools. The present invention automates the generation of XMI files and middleware applications used to provide for the web interface, as well as deployment of the generated components to the appropriate servers in response to a single input. The present invention facilitates generation of XMI files suitable for supporting a web services as well as middleware web interface applications for interfacing with MFS-based IMS applications. In addition, the present invention supports automatic generation of web interfaces for a plurality of MFS-based IMS applications during a single execution session.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically generating a web interface for an MFS-based IMS application, comprising:
    an interface accepting a parameter set provided as a single input;
    importing MFS-based IMS source files corresponding to an MFS-based IMS application;
    generating and storing at least one eXtended Markup Language Metadata Interchange (XMI) file comprising a standardized metadata description of MIDs/DIFs pairs and MODs/DOFs pairs for the MFS-based IMS application associated with the imported MFS-based IMS source files;
    generating a middleware application from the at least one XMI file, the middleware application configured to interface between a client application and the MFS-based IMS application; and
    automatically deploying without human intervention the generated at least one XMI file and middleware application to one or more servers.

2. The method of claim 1, further comprising loading a script comprising the parameter set from persistent storage.

3. The method of claim 2, wherein the script comprises a plurality of parameter sets each associated with a different MFS-based IMS application.

4. The method of claim 1, wherein the parameter set is manually entered, the method further comprising storing the manually entered parameter set.

5. The method of claim 1, wherein the interface comprises a plurality of modes, each mode comprising a different level of user interaction.

6. The method of claim 5, wherein one mode comprises a batch mode that reads the parameter set from persistent storage.

7. The method of claim 1, further comprising presenting an error message in response to an error condition triggered when generating the at least one XMI file.

8. The method of claim 1, wherein importing comprises importing a plurality of MFS-based IMS source files from a single directory in response to a single parameter.

9. The method of claim 6, wherein one mode comprises a novice mode that prompts a user for each parameter in the parameter set.

10. The method of claim 9, wherein one mode comprises an expert mode that prompts the user to enter the parameter set as a single entry.

11. A utility comprising a program storage medium readable by a processor and embodying one or more instructions for automatically generating a web interface for a MFS-based IMS application, comprising:
an interface configured to accept a parameter set provided as a single input;
an import module configured to import MFS-based IMS source files corresponding to an MFS-based IMS application;
a metadata generator configured to generate and store at least one eXtended Markup Language Metadata Interchange (XMI) file comprising a standardized metadata description of MIDs/DIFs pairs and MODs/DOFs pairs for the MFS-based MS application associated with the imported MFS-based IMS source files;
a code generator configured to generate a middleware application from the at least one XMI file, the middleware application configured to interface between a client application and the MFS-based IMS application; and
a deployment module configured to automatically deploy without human intervention the generated at least one XMI file and middleware application to one or more servers.

12. The utility of claim 11, further comprising a loader configured to load a script comprising the parameter set from persistent storage.

13. The utility of claim 12, wherein the script comprises a plurality of parameter sets each associated with a different MFS-based IMS application.

14. The utility of claim 11, wherein the parameter set is manually entered, the utility further comprising a storage module configured to store the manually entered parameter set.

15. The utility of claim 11, wherein the interface comprises a plurality of modes, each mode comprising a different level of user interaction.

16. The utility of claim 15, wherein one mode comprises a batch mode that reads the parameter set from persistent storage.

17. The utility of claim 11, further comprising an error module configured to present an error message in response to an error condition triggered when generating the at least one XMI file.

18. The utility of claim 11, wherein the import module is configured to import a plurality of MFS-based IMS source files from a single directory in response to a single parameter.

19. The utility of claim 17, wherein one mode comprises a novice mode that prompts a user for each parameter in the parameter set.

20. The utility of claim 19, wherein one mode comprises an expert mode that prompts the user to enter the parameter set as a single entry.

21. An article of manufacture comprising a program storage medium readable by a processor and embodying one or more instructions executable by the processor to perform a method for automatically generating a web interface for an MFS-based IMS application, the method comprising:
an interface accepting a parameter set provided as a single input;
importing MFS-based IMS source files corresponding to an MFS-based IMS application;
generating and storing at least one eXtended Markup Language Metadata Interchange (XMI) file comprising a standardized metadata description of MIDs/DIFs pairs and MODs/DOFs pairs for the MFS-based IMS application associated with the imported MFS-based IMS source files;
generating a middleware application from the at least one XMI file, the middleware application configured to interface between a client application and the MFS-based IMS application; and
automatically deploying without human intervention the generated at least one XMI file and middleware application to one or more servers.

22. The article of manufacture of claim 21, the method further comprising loading a script comprising the parameter set from persistent storage.

23. The article of manufacture of claim 22, wherein the script comprises a plurality of parameter sets each associated with a different MFS-based IMS application.

24. The article of manufacture of claim 21, wherein the parameter set is manually entered, the method further comprising storing the manually entered parameter set.

25. The article of manufacture of claim 21, wherein the interface comprises a plurality of modes, each mode comprising a different level of user interaction.

26. The article of manufacture of claim 25, wherein one mode comprises a batch mode that reads the parameter set from persistent storage.

27. The article of manufacture of claim 21, the method further comprising presenting an error message in response to an error condition triggered when generating the at least one XMI file.

28. The article of manufacture of claim 21, the method further comprising importing a plurality of MFS-based IMS source files from a single directory in response to a single parameter.

29. The article of manufacture of claim 27, wherein one mode comprises a novice mode that prompts a user for each parameter in the parameter set.

30. The article of manufacture of claim 29, wherein one mode comprises an expert mode that prompts the user to enter the parameter set as a single entry.

* * * * *